United States Patent [19]

Roth

[11] 4,337,627
[45] Jul. 6, 1982

[54] APPARATUS FOR REFRIGERATING PROTEIN MATERIALS

[76] Inventor: Eldon N. Roth, 99 Madera Ct., San Ramon, Calif. 94583

[21] Appl. No.: 271,546

[22] Filed: Jun. 8, 1981

Related U.S. Application Data

[60] Division of Ser. No. 103,498, Dec. 14, 1979, Pat. No. 4,294,860, which is a continuation-in-part of Ser. No. 970,579, Dec. 18, 1978, abandoned, which is a continuation of Ser. No. 849,166, Nov. 7, 1977, abandoned.

[51] Int. Cl.³ .............................................. A23G 9/00
[52] U.S. Cl. ...................................... 62/346; 62/381; 165/89; 426/517; 426/524
[58] Field of Search .......................... 62/345, 346, 381; 165/89, 90, 91; 426/517, 524

[56] References Cited

U.S. PATENT DOCUMENTS

| | | | |
|---|---|---|---|
| 2,352,210 | 6/1944 | Kraft | 426/517 |
| 2,397,446 | 3/1946 | Tansley | 62/345 |
| 2,513,898 | 7/1950 | Switzer | 165/94 |
| 3,116,787 | 1/1964 | Campbell | 165/90 |
| 3,182,587 | 5/1965 | Woodhall | 165/89 |
| 3,402,568 | 9/1968 | Kamin et al. | 62/345 |
| 3,436,927 | 4/1969 | Gruber | 62/345 |
| 3,774,409 | 11/1973 | Persson et al. | 62/346 |
| 3,887,719 | 6/1975 | Miller | 426/517 |
| 4,107,938 | 8/1978 | Sollich | 62/346 |

*Primary Examiner*—Ronald C. Capossela
*Attorney, Agent, or Firm*—Fitch, Even, Tabin, Flannery & Welsh

[57] ABSTRACT

In a process for refrigerating protein materials, the material is prepared as a viscous paste at a relatively hot temperature and applied to a refrigerated heat transfer surface on a rotating drum, the temperatures of the protein material and the drum surface having a predetermined differential to cause congealed or frozen liquid at the interface between the protein material and drum surface to initially melt and immediately thereafter congeal or freeze in order to cause adhesion of the protein material to the surface. The protein material is compressed against the drum surface to improve heat transfer characteristics and subsequently removed in a suitably refrigerated or frozen condition. Initial heating may be extended to render excessive fat or to reduce bacterial content. Opposite surfaces of the sheet of material may also be contacted by first and second refrigerated heat transfer surfaces either simultaneously or in successive order. The temperature of an application roller for applying the viscous paste to the drum surface is preferably controlled to prevent sticking of the material to the application roller.

6 Claims, 4 Drawing Figures

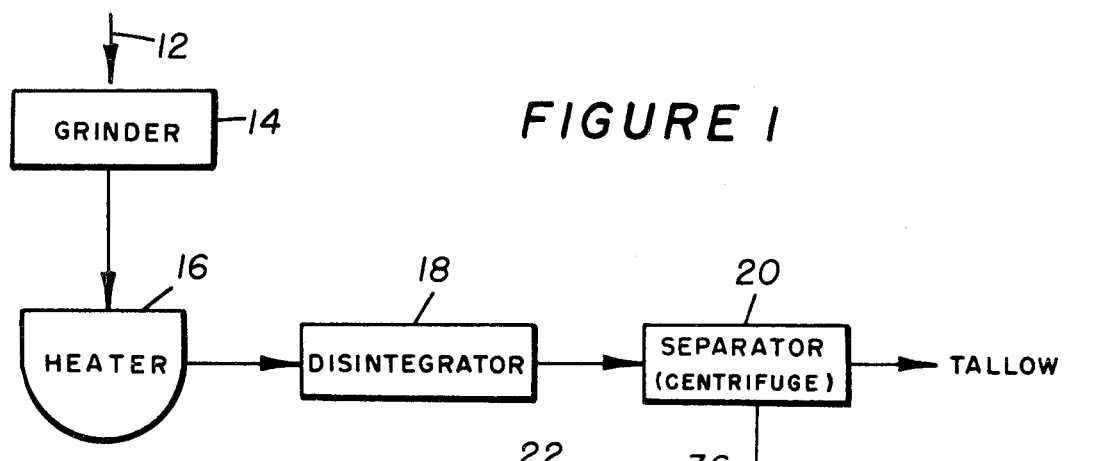
FIGURE 1
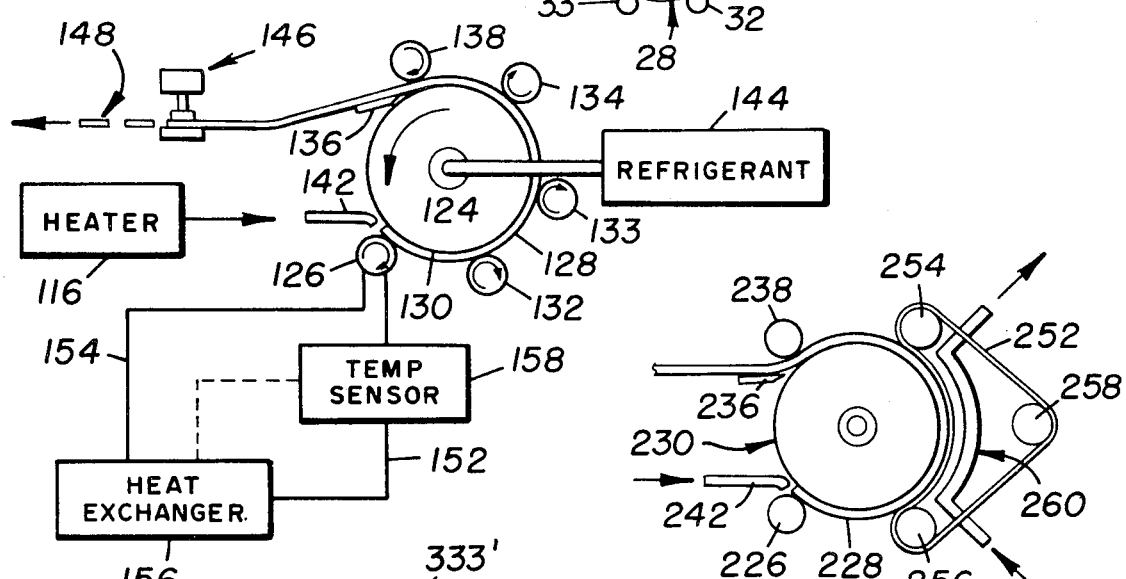
FIGURE 2
FIGURE 3
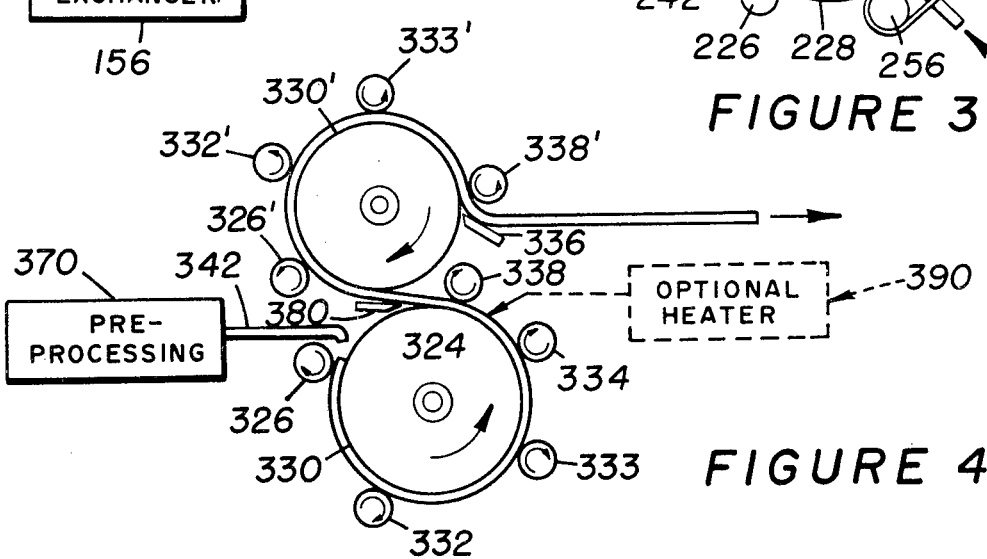
FIGURE 4

APPARATUS FOR REFRIGERATING PROTEIN MATERIALS

BACKGROUND OF THE INVENTION

This is a division of application Ser. No. 103,498, filed Dec. 14, 1979, now U.S. Pat. No. 4,294,860, which is a continuation-in-part of application Ser. No. 970,579, filed Dec. 18, 1978, which in turn was a continuation of application Ser. No. 849,166, filed Nov. 7, 1977, now both abandoned.

The present invention relates to a process for cooling or refrigerating protein-containing material and more particularly to such a process wherein the material is initially maintained at a temperature higher than that of a refrigerated drum to which it is applied as a thin sheet to promote adhesion of the material to the drum surface.

The invention is particularly concerned with the processing of protein-containing material such as animal products and the like to prepare them for subsequent use. The process may be employed to prepare foods for human consumption or for consumption by animals, for example, pet foods. With many animal products of the type contemplated by the present invention, it is necessary to rapidly refrigerate the material in order to prevent deterioration. Deterioration may result from a rapid and undesirable increase in the bacterial count of the product or from cell damage or rupture due to formation of large ice crystals, caused for example by freezing material at a slow rate.

Products of the type contemplated by the present invention include relatively high percentages of solids. Accordingly, the materials to be refrigerated within the process of the present invention and referred to herein as a "viscous paste" may generally be characterized as being in a solid state prior to refrigeration. Viscous pastes of the type contemplated by the present invention may include ground, rendered or otherwise divided protein materials, for example, ground beef or hamburger, ground pork, deboned beef or pork, various poultry meats, defatted pork and even protein materials derived from vegetables such as spinach, squash, soy beans and the like. Refrigeration of such products presents certain problems which are often not encountered for example in the refrigeration of simple liquid materials. In particular, such solid materials tend to be relatively bulky and often have a low density with poor heat transfer characteristics.

In the past, such materials have often been cooled or refrigerated in relatively large blocks. Within these large blocks of material, the outer surfaces are first refrigerated with heat finally being removed from the center of the block only after an extended period of time. Because of the substantial time duration required for refrigeration, excessive bacterial growth often occurs particularly within the center of the blocks before they are suitably refrigerated.

Additional problems arise in the processing of such protein-containing materials. For example, they often tend to have excessive percentages of fat which must eventually be reduced in order to achieve a suitable protein content in the final product. One particular example in this regard concerns the recovery of protein-containing meat from animal fat and the like which has been trimmed from the carcasses of butchered animals. In processing such animal fat, it is necessary to separate the animal fat from the protein material and then to process the separated protein material for subsequent use.

In other applications, the protein material may have an excessive initial bacterial content which must be reduced before the protein material is to be processed or refrigerated prior to subsequent use.

In applications of the type outlined above, it is necessary to process the protein material rapidly in order to eliminate or minimize the possible increase of the bacterial count before the protein material is suitably refrigerated. Accordingly, there has been found to be a need for an improved refrigeration process which can be employed in applications of the type summarized above while overcomimg one or more of the above problems.

SUMMARY OF THE INVENTION

It is therefore an object of the invention to provide a process for rapidly refrigerating protein materials which are normally subject to undesirable bacterial growth. In accomplishing this object, the present invention contemplates applying the protein material, in the form of a viscous paste, as a relatively uniform sheet upon a refrigerated heat transfer surface with a temperature differential between the protein material and heat transfer surface, the relatively hot temperature of the paste causing congealed or frozen liquid at the interface between the sheet of protein paste and the heat transfer surface to initially melt and immediately thereafter become frozen or congealed in order to bind the protein paste to the heat transfer surface and improve heat transfer characteristics between the heat transfer surface and the sheet of protein paste.

A number of additional advantages are possible through a process of the type contemplated by the present invention. In particular, the protein material may be initially maintained at a relatively hot temperature in order to either render or remove excessive fatty material before further processing. Similarly, the protein material may be maintained at a relatively high temperature to initially reduce the bacterial content therein. In either case, it is then desirable to rapidly refrigerate the remaining protein material in order to limit bacterial growth before all of the protein material is refrigerated to a suitable temperature. In certain instances, the bacterial content may be even further reduced by the refrigeration process itself, as is made more apparent below.

The process of the present invention is sometimes contemplated for forming somewhat thicker sheets of material. For example, a relatively thick sheet of protein material may be refrigerated and divided into separately formed shapes such as patties of hamburger meat. In such applications, it is particularly important to be able to rapidly cool the entire sheet of protein material in minimum time while maintaining very uniform thickness and weight of the individual patties. Accordingly, the present invention also contemplates contacting opposite sides of the sheet of protein material with first and second refrigerated heat transfer surfaces. Contact of the sheet with the first and second heat transfer surfaces may occur simultaneously or successively as will be made more apparent in the following description.

In applications where it is desirable to recover the final product in a divided form such as patties, one step in the process of the present invention may include division of the sheet into suitable shapes.

Finally, it is noted that the protein material is applied to the heat exchange surface of the drum by an application roller. In certain applications, it has been observed that the protein material tends to adhere to the application roller as well as the drum, thereby resulting in a tendency for the sheet of protein material to be separated as it passes away from the application roller. Where such a tendency develops, the temperature of the application roller is preferably maintained within a relatively narrow temperature range in order to prevent adhesion of the protein material to the application roller.

Additional objects and advantages of the present invention are made apparent in the following description.

BRIEF DESCRIPTION OF THE DRAWINGS

FIG. 1 is a generally schematic representation of one embodiment of apparatus for performing the process of the present invention.

FIG. 2 is a side view of the apparatus.

FIG. 3 illustrates an alternate embodiment of refrigeration equipment including first and second heat transfer surfaces for cooling both sides of a sheet of protein material.

FIG. 4 is yet another similar view of a further embodiment of refrigeration apparatus adapted to provide refrigeration equipment including first and second heat transfer surfaces for cooling both sides of a sheet of protein material as well as means for dividing the sheet into a desired form such as patties.

DESCRIPTION OF THE PREFERRED EMBODIMENTS

As was indicated above, the process of the present invention relates to the refrigeration of protein materials. Within the process, the substantially solid protein material contemplated for treatment by the present invention is initially ground or otherwise reduced to a viscous paste consistency and heated to a selected temperature. The protein paste is then applied in a uniform sheet to a refrigerated heat transfer surface with a temperature differential being maintained between the protein paste and the heat transfer surface.

The relatively hot temperature of the protein paste and the cold temperature of the heat transfer surface are selected to cause congealed or frozen liquid at the interface between the heat transfer surface and sheet of protein paste to be melted and immediately thereafter congealed or frozen due to removal of heat by the heat transfer surface. In this manner, the protein paste is caused to tightly adhere to the heat transfer surface in order to provide excellent heat transfer characteristics between the surface and the protein paste as well as to prevent premature separation of the paste from the drum.

In some applications, the "hot" temperature contemplated within the invention for the protein material may be closer to the temperature of the refrigerated heat transfer surface. For example, a protein material such as inedible poultry byproducts readily adheres to the drum at a lower temperature because of a relatively high water content and a reduced percentage of fat which would otherwise tend to congeal on the heat transfer surface.

In applications of this type, sufficient heating may be accomplished merely by the mechanical energy developed in grinding the protein material or otherwise reducing it to a viscous paste consistency. This may be more readily understood by noting that the "relatively hot" temperature of protein materials such as meat may be as low as 80°–90° F. or even as low as 70° F. or lower in accordance with the present invention.

The sheet of protein paste is formed and compressed against the drum and then rapidly refrigerated upon the heat transfer surface. During refrigeration, the sheet of protein paste may again be compressed upon the heat transfer surface to even further improve heat transfer characteristics across the depth of the protein sheet.

FIG. 1 illustrates apparatus for accomplishing such a process, the apparatus of FIG. 1 being adapted for treating animal products having a very high fat content. Accordingly, the animal product introduced into the process of FIG. 1 is heated over an extended period of time to render or remove a substantial portion of the fat, the remaining protein solids being reduced to a viscous paste having a consistency like hamburger, for example, and refrigerated in the manner described above.

In FIG. 2, apparatus for accomplishing the refrigeration step is illustrated in somewhat greater detail along with means for dividing the resulting refrigerated sheet of protein paste into divided shapes such as separate patties.

FIG. 3 similarly illustrates apparatus for accomplishing the refrigeration step. However, the apparatus of FIG. 3 is especially contemplated for processing somewhat thicker sheets of protein paste or ground meat. In order to permit rapid refrigeration throughout the depth of the sheet of paste, an additional refrigerated heat transfer surface is formed in contact with the sheet of protein paste while it is in place upon the heat transfer surface of a refrigerated drum so that heat is rapidly removed from both sides.

At this point, it is noted that refrigeration apparatus of the type illustrated in FIGS. 1, 2 and 3 is described in substantially greater detail within a prior U.S. patent application, Ser. No. 688,599, filed May 21, 1976 by the inventor of the present invention, now U.S. Pat. No. 4,098,095, issued July 4, 1978. In addition, similar refrigeration equipment including means for dividing the resulting frozen sheet of protein material into individual patties, as summarized above in connection with FIG. 2, was also described in an earlier U.S. patent application, Ser. No. 778,492, filed Mar. 17, 1977 by the inventor of the present invention, now U.S. Pat. No. 4,138,768, issued Feb. 13, 1979.

FIG. 4 also illustrates refrigeration apparatus suitable for use within the process of the present invention, the apparatus of FIG. 4 being particularly adaptable for rapid refrigeration of relatively thick sheets of protein-containing paste material.

As was indicated above, the process of the present invention is adapted for use in various applications for processing different types of protein-containing materials. Referring particularly to FIG. 1, one such application contemplates the removal of protein material from high fat material obtained for example by the trimming of fat from the carcasses of meat producing animals.

The fat is rendered and removed, as tallow, while the remaining protein-containing material, having a relatively high solids content, is reduced to a thick viscous paste and refrigerated in the manner described above. The protein-containing material obtained in this manner is commonly referred to either as "edible rendered beef" suitable for human consumption or "inedible rendered beef" which may be employed, for example, in the production of pet foods or the like.

The protein-containing material remaining after rendering the fat from the initial meat product may have the following typical composition:

| | |
|---|---|
| Protein | 18–20% |
| Fat | 9–16% |
| Moisture | 63–72% |
| Miscellaneous | 1% |

The process of the present invention may also be employed in connection with a variety of other protein materials which may be either from an animal or plant source, for example. With most protein-containing materials from animal sources, the water and fat content of the material normally provides sufficient liquid content to permit formation of a viscous paste as contemplated by the invention. With the process of the invention being adapted for example to other materials or even to other meat products not having sufficient water, fat, or the like, possibly some liquid material may have to be added in order to reduce the protein material to a suitable viscous paste consistency.

Other examples of protein-containing animal products which may be refrigerated by the present invention include deboned chicken meat which is commonly processed to form an edible food product as well as finely ground chicken which may also be converted into an edible food product. Typical compositions for these materials are set forth below:

| 1. Edible deboned chicken meat | |
|---|---|
| Protein | 13–14% |
| Fat | 14–16% |
| Water | 69–72% |
| Miscellaneous | 1% |
| 2. Finely Ground Chicken | |
| Protein | 11½–12½% |
| Fat | 22–24% |
| Water | 62½–65½% |
| Miscellaneous | 1% |

Similarly, certain "inedible" protein-containing animal products may be processed by the present invention in order to convert them into usable products such as pet food for example. Such meat products include inedible poultry byproducts (feet, etc.) and ground whole chicken which, for one reason or another, are not suitable for use in edible food products. A typical composition of such materials is set forth below:

| 3. Inedible Poultry Byproducts | |
|---|---|
| Protein | 15% |
| Fat | 10% |
| Water | 70% |
| Miscellaneous | 5% |
| 4. Ground Whole Chicken | |
| Protein | 15% |
| Fat | 13% |
| Moisture | 68% |
| Miscellaneous | 4% |

A number of common characteristics will be apparent from a review of the meat products described above. Initially, it may be seen for example in connection with finely ground chicken that the fat content is relatively high. Accordingly, in order to improve the product obtained from such material, the initial heating step of the present invention may be prolonged in order to selectively render a portion of the fat and selectively reduce the percentage of fat in the product.

In addition, it is sometimes desirable to heat materials of the type outlined above before they are refrigerated to reduce the bacterial content of the material. The present invention may also be particularly adapted for use with such material by extending the duration of the initial heating step in order to accomplish reduction of the bacterial content of the material.

Within either of the preceding examples, whether the protein-containing material is heated to render and remove excessive fat or to reduce the bacterial count of the material, the relatively high temperature of the material is then maintained or adjusted as necessary and applied to a heat transfer surface for refrigeration.

A detailed description of the process of the present invention is set forth below with reference to the various figures described above.

Referring to FIG. 1, apparatus is schematically illustrated and indicated at 10 for rendering high fat animal products such as fat trimmings, separating resultant tallow from the protein-containing material, recovering the protein-containing material in the form of a relatively hot viscous paste and refrigerating that material upon a drum refrigerator in accordance with the present invention.

The fat trimmings are introduced at 12 to a grinder 14 in order to facilitate rendering of the fat trimmings. The product from the grinder 14 is then introduced into a heating unit 16, for example, a steam kettle, to heat the ground fat trimmings to a relatively high temperature, for example 110°–120° F. Material from the heating unit 16 is then passed through a machine 18 to reduce the material to a smaller particle size. Accordingly, the machine 18 may be of conventional construction, for example a Reitz Disintegrator. The material from the machine 18 is introduced into a separation means or centrifuge 20 for removing a substantial portion of the fat as tallow.

The remaining protein-containing material is at the relatively high temperature, for example, about 120° F., partly due to the additional heating produced by mechanical working in the machine 18 and 20. In any event, the protein-containing material is in the form of a relatively hot viscous paste which may then be rapidly refrigerated to a chilled or frozen condition by the drum refrigerator indicated at 22.

The construction and operation of the drum refrigerator 22 is described in substantial detail in the above-noted reference. To briefly summarize its operation, the relatively hot viscous paste is spread along the nip between a large refrigerated drum 24 and a feed or application roller 26. The feed roller spreads the viscous paste out in a sheet 28 of uniform thickness upon a heat transfer surface 30 of the drum 24. The surface 30 is maintained, for example, at a refrigerated temperature of about 0° F. or lower.

The "relatively cold" temperature of the heat exchange surface selected to accomplish the purpose of this invention varies considerably depending for example on the water and fat content of the protein material. The temperature of the heat exchange surface could vary from about 30° F. to about −50° F. or lower depending upon the composition of the material and the contemplated application or end use.

Operation of the invention with the refrigerated heat transfer surface being maintained below −50° F. is particularly contemplated in connection with the refrigeration or processing of pork products or other meats which may carry trichinosis. In processing such meats, it is commonly necessary to certify adequate refrigeration of the meat as a means of eliminating the bacterial carrier of trichinosis. The meat may either be refrigerated for an extended time or uniformly frozen to a temperature below 50° F. to assure destruction of the bacteria. In the past, it has only been possible to refrigerate meat to such a low temperature by cryogenic techniques which are very expensive. The present invention provides a relatively simple and particularly effective means for uniformly refrigerating meat to a sufficiently low temperature to afford immediate certification and thereby eliminate the need to store the meat for extended periods of time in order to conform with other requirements for certification.

In addition, the feed roller 26 initially compresses the viscous paste against the surface of the drum. The relatively hot temperature of the protein-containing viscous paste and the relatively cold temperature of the drum surface 30 are selected so that congealed or frozen liquid existing at the interface between the surface 30 and sheet 28 is initially melted and immediately thereafter frozen in order to develop adhesion between the sheet 28 and surface 30. This is a critical feature of the present invention since, in many applications, it is difficult to obtain adhesion of a protein-containing material having relatively high solids to a heat transfer surface in order to achieve rapid refrigeration. The present invention accomplishes this by initially heating the protein-containing paste and then applying it to a cooled or refrigerated heat transfer surface in the manner described immediately above to ensure adhesion and effective and rapid heat transfer.

While the sheet 28 is upon the surface 30 of the drum, it is compressed by rollers 32, 33 and 34 to further increase heat transfer efficiency between the surface 30 and the sheet 28. This feature is also described in substantial detail in the abovenoted reference. After the sheet 28 of protein-containing material is suitably refrigerated, to about 0° F. for example, it is removed from the drum surface 30 by a blade 36 and recovered as a refrigerated product which is suitable for prolonged storage or for immediate use.

The present invention is particularly concerned with developing a high degree of adhesion between the heat transfer surface 30 and the sheet 28 of protein-containing material. However, after the sheet 28 is suitably refrigerated, it is relatively easy to remove as a continuous sheet by means such as the blade 36. It is theorized that, as the sheet 28 is refrigerated upon the drum 24, it experiences some shrinkage. Because of this effect, the sheet 28 continues to remain in engagement with the surface 30 of the drum 24 but it becomes readily separable as a continuous sheet. This feature of the invention is particularly important as will be made more apparent below since, in many applications, it is desirable to obtain the refrigerated material in a continuous sheet in order to facilitate further processing.

Because of the refrigerated condition of the drum 24, its surface 30 tends to become coated with frost when it is exposed to the room environment between the blade 36 and the application of additional protein-containing material by the feed roll 26. If any substantial depth of frost or other congealed or frozen material is present upon the surface 30 of the drum, it has been found very difficult to cause high solids material to adhere to the drum, particularly when the frost or other material does not firmly adhere to the drum. The present invention eliminates this problem.

Edible rendered beef of the type particularly contemplated in the preceding description of FIG. 1 is of particular interest since it is sometimes employed as a component in the production of various "sausage" type meats including sausages, hot dogs and the like. Generally, edible rendered beef is composed of collagen type protein commonly found in connective tissue for example. The protein content of such material adapts it for processing within such meat products. However, various meat components used in such products also are rated as to their ability to act as a "binder". In the past, it has been necessary to maintain the percentage of collagen type protein meats at a relatively low percentage in sausage type meats because of their poor performance as a binder. However, it has been found that processing or refrigeration of such materials in accordance with the present invention produces a product which not only has an acceptable protein percentage but also has improved characteristics as a binder. The reason for this is not known. However, it can be theorized that the improved performance as a binder is also due to the more rapid rate of refrigeration accomplished by the present invention.

Having reference to FIG. 2, a similar refrigerating drum is illustrated along with means for cooking a protein-containing viscous paste of the type contemplated by the present invention. In FIG. 2, the refrigerated drum is indicated at 124 along with a feed roll 126 and similar compression rollers 132, 133 and 134. High temperature paste from the heating unit indicated at 116 is transferred to the heat exchange surface 130 of the drum 124 by means of a feed conduit 142. A blade means for removing sheet material 128 from the drum is indicated at 136. An additional roller 138 is provided adjacent the blade 136 in order to assure that the sheet 128 is removed from the surface 130 of the drum 124 in continuous form.

A source of refrigerant indicated at 144 provides a refrigerated fluid to the interior of the drum 124 to maintain the heat transfer surface 130 at a cold temperature.

After the sheet 128 of protein-containing material is removed from the drum by the blade 136, it is passed through a cutter or punch assembly 146 in order to separate the refrigerated or chilled sheet 128 into divided shapes such as the patties indicated at 148. With the apparatus of FIG. 2, the frozen or chilled patties 148 are also suitably prepared for prolonged storage or for immediate use.

As was noted above, the sheet of protein material may tend to adhere to the feed or application roll 126, depending particularly upon certain characteristics of the protein material such as fat content, temperature and the like. Such adhesion is undesirable since it may disrupt intimate contact between the sheet and the drum surface or cause separation within the sheet of protein material itself. In either event, the continuity of the sheet and its intimate heat transfer engagement with the drum surface are interrupted or diminished.

In order to avoid such problems, it has been found that adhesion of the protein material to the feed roll 126 may be avoided by closely controlling the temperature of the feed roll itself. Accordingly, conduits 152 and 154 are provided for circulating a heat exchange fluid between the hollow feed roll 126 and a heat exchanger 156. A temperature sensor 158 is arranged along the conduit supplying the heat exchange fluid from the feed roll to the heat exchanger in order to sense temperature of the fluid from the feed roll which is indicative of the temperature along the surface of the feed roll in contact with the protein material. The heat exchanger 156 is conventionally responsive to the temperature sensor 158 and closely regulates the temperature of the heat exchange fluid within the feed roll and thus the surface of the feed roll.

As one example in connection with regulation of the feed roll temperature, rendered ground meat having a fat content of approximately 10–20% and a temperature of 120° F. has been applied to the drum surface with the drum surface at a temperature of between −40° and +10° F. and more preferably about −10° F. Under these circumstances, it has been found that adhesion of the protein material to the feed roll may be avoided if the temperature of the feed roll itself is maintained at about 70° F. If the temperature of the feed roll varies substantially, for example more than 2° F. in either direction, there is increased tendency for the protein material to adhere to the drum. At the same time, since the protein material is hotter than the feed roll, engagement of the feed roll with the protein material tends to cause increasing temperature therein. The heat exchange fluid circulated through the feed roll is therefore preferably a coolant such as water or glycol or a combination of the two and the heat exchanger is preferably adapted for reducing the temperature of the coolant. In this manner, the temperature of the feed roll may be closely maintained within the range of for example 78°±2° F. in order to avoid adhesion of the protein material thereto.

At the same time, it is noted that adhesion of the protein material to the feed roll could be overcome for example by coating the feed roll with a release material such as that sold by the Du Pont Company under the Trademark TEFLON. However, the use of such material is undesirable in this application because of its constant contact with a food product.

Also it will be apparent that the temperature sensor 158 might be placed within the feed roll 126 in order to directly monitor the surface temperature of the drum. However, the arrangement described above in connection with FIG. 2 is believed to provide an accurate indication of the feed roll surface temperature.

In order to form divided shapes such as the patties 148, it is commonly necessary that the sheet of protein material be relatively thick. For example, with the apparatus illustrated in FIG. 1, a relatively thin sheet of protein material may be formed upon and removed from the surface 30 of the drum 24. For example, the sheet may have a thickness in the range of ⅛ to ¼ of an inch. However, in order to form patties for use in many food products such as hamburger sandwiches, it is desirable to form the sheet of material with a substantially greater thickness, possibly twice the thickness described above. With that increased thickness, substantially greater time is normally required to remove heat across the entire depth of the sheet and thereby refrigerate or suitably chill the entire sheet.

Thus, it may be seen that the present invention is particularly effective in producing refrigerated sheets of protein material which may be of closely controlled, uniform thickness and accordingly uniform density and weight in each portion of the sheet. This feature of the invention is also very important since it permits the formation of divided shapes such as patties which each contains an accurate predetermined amount of meat or protein material by weight.

The embodiment of FIG. 3 provides yet another refrigerated drum 224 which is especially adapted for more rapidly chilling such sheets of protein-containing material. The refrigerated drum is indicated at 224 and generally corresponds to the drum 124 described above in FIG. 2.

Relatively hot protein-containing material having a viscous paste consistency is applied to the surface 230 of the drum 224 from an inlet conduit 242. A feed roll 226 spreads the relatively hot material upon the surface 230 of the drum. A blade 236 and associated roller 238 again function to remove the refrigerated sheet from the drum. In order to more rapidly chill or refrigerate the sheet 228, an additional heat transfer surface is formed by a continuous belt 252 of suitable heat transfer material, which is trained about rollers 254, 256 and 258. The rollers 254 and 256 are arranged so that the heat exchange belt 252 is maintained in heat exchange engagement with the sheet 228 along a substantial portion of the drum surface 230. An additional refrigerating unit 260 serves to maintain the refrigerated or low temperature condition of the belt 252 while it is heat exchange engagement with the sheet 228 of protein-containing material.

Thus, heat is removed from both the inner and outer surfaces of the sheet of 238 in order to substantially reduce the duration of time required for refrigeration. Such a reduction in time of course increases efficiency of the process, further minimizes the possibility of bacterial growth within the protein-containing material and maintains product quality. Improved product quality is achieved since rapid freezing prevents cell rupture commonly caused by formation of large ice crystals during slow freezing; thus, product flavor and tenderness are maintained.

Yet another embodiment of apparatus adapted for use in the process of the present invention is illustrated in FIG. 4. Two refrigerated drums 324 and 324' are provided to refrigerate both surfaces of a sheet 328 of protein-containing material. However, in the embodiment of FIG. 4, opposite surfaces of the sheet 328 are cooled or frozen in consecutive order with the two refrigerated drums 324 and 324'.

Initially, relatively high temperature protein-containing material of a viscous consistency is produced by a pre-processing unit 370 and applied to the heat exchange surface 330 of the drum 324 by means of a feed conduit 342 and feed roll 326. Refrigeration of the sheet 328 commences with the sheet being urged into heat transfer engagement with the surface 330 by means of compression rollers 332, 333 and 334.

After the sheet 328 has been suitably chilled or refrigerated, it is removed from the surface 330 of the first drum 324 and immediately applied to the refrigerated heat exchange surface 330' of the second drum 324' by transfer means such as the blade 380. Because of the opposed relation of the two drums 324 and 324', one surface of the sheet 328 contacts the surface 330 of the first drum 324 while the opposite surface of the sheet 328 contacts the refrigerated heat exchange surface 330' and 324'. The sheet 328 is then removed from the second drum 324' by means of a blade 336.

Within the embodiment of FIG. 4, the outer or external surface of the sheet 328 must be relatively hot in accordance with the present invention when it is applied to the surface 330' of the second drum in order to assure adhesion and heat transfer efficiency therebetween. Accordingly, refrigeration of the sheet 328 upon the first drum may be reduced so that the outer surface of the sheet 328 is not substantially cooled before it is engaged with the second drum 324'. In the event that the outer surface of the sheet 328 is not sufficiently hot upon application to the second drum to ensure adhesion, an optional heater 390 may be employed intermediate the two drums 324 and 324' in order to slightly heat the exposed surface of the sheet 328 in accordance with the present invention to promote its adhesion with the heat exchange surface 330' of the second drum.

Various embodiments of apparatus suitable for accomplishing the process of the present invention have been described above. It will be immediately apparent that additional modifications are possible within the scope of the present invention which is defined only by the following appended claims.

What is claimed is:

1. Apparatus for rapidly reducing the temperature of a viscous paste substance, said apparatus comprising
   a first drum having a cylindrical exterior surface formed of thermally conductive heat transfer material,
   means for refrigerating said heat transfer surface,
   means for rotatively driving said first drum,
   means for introducing a sheet of the viscous paste substance onto the surface of said first drum and for urging said viscous paste sheet into intimate heat exchange contact with said heat exchange surface of said first drum,
   a second drum having a cylindrical exterior surface formed of thermally conductive heat exchange material,
   means for refrigerating said heat exchange surface of said second drum,
   means for rotatively driving said second drum,
   transfer means for removing said sheet of viscous paste substance from said first drum and applying it to the heat exchange surface of said second drum with the originally exposed surface of the sheet adjacent said heat exchange surface of said second drum, and
   means for removing said sheet of viscous paste substance from said second drum.

2. The apparatus of claim 1 further comprising means for heating the viscous paste before it is introduced onto the surface of said first drum.

3. The apparatus of claim 1 further comprising means for selectively heating the originally exposed surface of the sheet before it is applied to the heat exchange surface of said second drum.

4. The apparatus of claim 1 further comprising means for urging the sheet into intimate heat exchange contact with the heat exchange surface of said second drum.

5. Apparatus for rapidly reducing the temperature of a viscous paste substance, said apparatus comprising
   a refrigerated drum having a cylindrical exterior surface formed of thermally conductive heat transfer material,
   means for refrigerating said heat transfer drum surface,
   means for rotatably driving said refrigerated drum,
   a rotatable feed roll arranged adjacent said heat transfer surface of said refrigerated drum for introducing a sheet of the viscous paste substance onto the surface of said refrigerated drum and for urging said viscous paste sheet into intimate heat exchange contact with said heat exchange surface of said first drum,
   means for selectively regulating the temperature of said feed roll in order to assure release of said viscous paste sheet therefrom, and
   means for removing said sheet of viscous paste substance from said refrigerated drum.

6. The apparatus of claim 5 wherein said feed roll is hollow and said means for selectively regulating the temperature of said feed roll comprises means for circulating heat exchange fluid through said feed roll, means for sensing the temperature of the feed roll and means responsive to said temperature sensor for regulating the temperature of the heat exchange fluid.

* * * * *